(12) United States Patent
Pierron et al.

(10) Patent No.: US 10,065,480 B2
(45) Date of Patent: Sep. 4, 2018

(54) ELECTRICAL HEATING DEVICE FOR A MOTOR VEHICLE, AND ASSOCIATED HEATING, VENTILATION AND/OR AIR CONDITIONING APPARATUS

(71) Applicant: Valeo Systemes Thermiques, Le Mesnil Saint Denis (FR)

(72) Inventors: Frederic Pierron, Rambouillet (FR); Laurent Tellier, Paris (FR); Jose Leborgne, Luisant (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 220 days.

(21) Appl. No.: 14/388,351

(22) PCT Filed: Feb. 8, 2013

(86) PCT No.: PCT/EP2013/052527
§ 371 (c)(1),
(2) Date: Sep. 26, 2014

(87) PCT Pub. No.: WO2013/143739
PCT Pub. Date: Oct. 3, 2013

(65) Prior Publication Data
US 2015/0043899 A1    Feb. 12, 2015

(30) Foreign Application Priority Data

Mar. 28, 2012   (FR) .................................... 12 00930

(51) Int. Cl.
*F24H 1/10*    (2006.01)
*B60H 1/22*    (2006.01)
(Continued)

(52) U.S. Cl.
CPC ........... *B60H 1/2225* (2013.01); *F24H 1/009* (2013.01); *F24H 1/102* (2013.01); *F24H 9/0015* (2013.01); *F28F 1/10* (2013.01)

(58) Field of Classification Search
None
See application file for complete search history.

(56) References Cited

U.S. PATENT DOCUMENTS 806,139 A * 12/1905 Hayes ..................... C01B 3/363
                                             123/25 B
1,671,677 A * 5/1928 Keeton .................. F24H 1/142
                                             392/489
(Continued)

FOREIGN PATENT DOCUMENTS

DE    295 08 171 U1    9/1995
DE    199 44 951 A1    3/2001
(Continued)

OTHER PUBLICATIONS

International Search Report for Application No. PCT/EP2013/052527 dated Apr. 5, 2013, 7 pages.
(Continued)

*Primary Examiner* — Thor Campbell
(74) *Attorney, Agent, or Firm* — Howard & Howard Attorneys PLLC

(57) ABSTRACT

The invention relates to a device (5) for electrically heating fluid for a motor vehicle, said heating device (5) comprising at least one heating module (7a, 7b) for heating said fluid, said at least one heating module (7a, 7b) comprising a central core (11) and a heating element (13) defining a guide circuit (15) that guides the fluid between said heating element (13) and said central core (11) such that said at least one heating module (7a, 7b) comprises at least one disturbing element (17; 27; 37; 47) arranged in the fluid guide circuit (15) around the central core (11) and able to disturb (Continued)

the flow of said fluid. The invention also relates to a heating, ventilation and/or air conditioning apparatus (1) for a motor vehicle that comprises such an electrical heating device (5).

20 Claims, 4 Drawing Sheets

(51) Int. Cl.
*F24H 1/00* (2006.01)
*F24H 9/00* (2006.01)
*F28F 1/10* (2006.01)

(56) References Cited

U.S. PATENT DOCUMENTS

| | | | | |
|---|---|---|---|---|
| 2,060,936 | A * | 11/1936 | Haag, Jr. | F28D 7/026 137/340 |
| 2,266,216 | A * | 12/1941 | Kimberlin | F02N 19/10 219/208 |
| 2,445,115 | A * | 7/1948 | Hanrahan | F28D 7/0066 165/141 |
| 2,775,683 | A * | 12/1956 | Kleist | F25B 43/00 222/146.3 |
| 3,334,400 | A * | 8/1967 | Jaeger | F28F 13/00 165/154 |
| 3,626,148 | A * | 12/1971 | Woytowich | F02N 19/10 123/142.5 E |
| 3,777,117 | A * | 12/1973 | Othmer | F24H 1/121 137/341 |
| 3,943,325 | A * | 3/1976 | Pickard | B60K 11/02 123/142.5 E |
| 4,208,570 | A * | 6/1980 | Rynard | F02N 19/10 123/142.5 E |
| 4,286,140 | A * | 8/1981 | Dewulf | F24H 9/2014 165/156 |
| 4,300,870 | A * | 11/1981 | Cox | A47J 31/542 392/471 |
| 4,360,059 | A * | 11/1982 | Funke | F28D 7/026 165/160 |
| 4,372,260 | A * | 2/1983 | Baker | B01D 35/18 123/142.5 E |
| 4,458,642 | A * | 7/1984 | Okubo | F01M 13/00 123/196 AB |
| 4,465,922 | A * | 8/1984 | Kolibas | F24H 1/121 165/156 |
| 4,480,172 | A * | 10/1984 | Ciciliot | F22B 1/288 165/140 |
| 4,770,134 | A * | 9/1988 | Foreman | F02N 19/10 123/142.5 R |
| 5,265,318 | A * | 11/1993 | Shero | B23P 11/025 15/321 |
| 5,408,960 | A * | 4/1995 | Woytowich | F02N 19/02 123/142.5 E |
| 5,806,479 | A * | 9/1998 | Bauer | B60H 1/032 123/142.5 R |
| 5,855,319 | A * | 1/1999 | Burner | B60H 1/032 237/12.3 B |
| 6,034,352 | A * | 3/2000 | Gortler | B60H 1/2209 219/202 |
| 6,093,909 | A * | 7/2000 | Beetz | B60H 1/2221 219/202 |
| 6,157,778 | A * | 12/2000 | Kadotani | F24H 1/142 165/154 |
| 6,236,810 | B1 * | 5/2001 | Kadotani | F25B 21/02 392/483 |
| 6,422,190 | B1 * | 7/2002 | Gortler | B60H 1/22 123/142.5 R |
| 6,434,972 | B1 | 8/2002 | Geiger et al. | |
| 6,611,660 | B1 * | 8/2003 | Sagal | F28F 1/124 219/546 |
| 6,724,983 | B1 * | 4/2004 | Humburg | B60H 1/22 165/41 |
| 6,919,535 | B2 * | 7/2005 | Uhl | B60H 1/2225 165/80.3 |
| 7,286,752 | B2 * | 10/2007 | Gourand | A47J 31/542 392/465 |
| 7,484,556 | B2 * | 2/2009 | Mita | C09K 5/06 165/135 |
| 7,574,987 | B2 * | 8/2009 | Preiholt | F02N 19/10 123/142.5 E |
| 7,756,404 | B2 * | 7/2010 | Schubert | F28D 7/026 392/478 |
| 7,977,606 | B2 * | 7/2011 | Adachi | H05B 3/50 219/202 |
| 8,249,437 | B2 * | 8/2012 | Commette | F24H 1/102 29/432 |
| 8,541,721 | B2 * | 9/2013 | Moskal | B21D 31/02 126/400 |
| 8,554,063 | B2 * | 10/2013 | Hsu | F22B 1/28 122/40 |
| 8,724,978 | B2 * | 5/2014 | Furumura | F22B 1/28 392/484 |
| 8,731,386 | B2 * | 5/2014 | Waechter | F24H 1/009 392/479 |
| 8,901,457 | B2 * | 12/2014 | Adachi | B60H 1/2221 219/202 |
| 8,948,582 | B2 * | 2/2015 | Kominami | F24H 9/20 165/175 |
| 9,119,232 | B2 * | 8/2015 | Clauss | H05B 3/24 |
| 9,127,762 | B2 * | 9/2015 | Oh | F16H 57/0413 |
| 9,161,391 | B2 * | 10/2015 | Niederer | H05B 3/24 |
| 9,279,599 | B2 * | 3/2016 | Lee | |
| 9,295,108 | B2 * | 3/2016 | Bohlender | H05B 3/24 |
| 9,296,275 | B2 * | 3/2016 | Huyghe | B60H 1/2225 |
| 9,362,740 | B1 * | 6/2016 | Elnar | A61H 33/0095 |
| 9,377,244 | B2 * | 6/2016 | Kominami | F28D 1/00 |
| 9,435,562 | B2 * | 9/2016 | Giffels | F24H 1/103 |
| 2006/0196448 | A1 * | 9/2006 | Hayworth | B60S 1/488 122/6.6 |
| 2007/0284457 | A1 * | 12/2007 | Shank | B05B 9/002 239/135 |
| 2008/0053981 | A1 * | 3/2008 | Adachi | H05B 3/50 219/202 |
| 2008/0138052 | A1 * | 6/2008 | Wu | B60S 1/487 392/465 |
| 2009/0107974 | A1 * | 4/2009 | Testa | B60H 1/034 219/208 |
| 2011/0180617 | A1 * | 7/2011 | Saito | B60H 1/2221 236/49.3 |
| 2012/0037606 | A1 * | 2/2012 | Huang | B60S 1/488 219/201 |
| 2012/0055913 | A1 * | 3/2012 | Huang | B60S 1/488 219/202 |
| 2012/0315024 | A1 | 12/2012 | Obst et al. | |
| 2015/0197134 | A1 * | 7/2015 | Carter | F01P 11/04 165/41 |

FOREIGN PATENT DOCUMENTS

| | | |
|---|---|---|
| DE | 100 12 675 A1 | 9/2001 |
| DE | 10 2010 060 446 A1 | 5/2011 |
| EP | 0 743 206 A2 | 11/1996 |
| FR | 2 074 687 A1 | 10/1971 |
| FR | 2 214 870 A1 | 8/1974 |
| WO | WO 2005/044478 A2 | 5/2005 |

OTHER PUBLICATIONS

Alexander, D., "Increased Cooling Performance from Denso", Automotive Engineering International, SAE International, Warrendale, PA, US, vol. 114, No. 4, Apr. 1, 2006 (Apr. 1, 2006) p. 46, XP001515521, ISSN: 1543-849X.

Machine-Assisted English translation for equivalent (AT221U1) of DE 295 08 171 extracted from espacenet.com database on Oct. 9, 2014, 8 pages.

English language abstract for DE 199 44 951 extracted from espacenet.com database on Oct. 9, 2014, 1 page.

(56) References Cited

OTHER PUBLICATIONS

English language abstract and machine-assisted English translation for DE 100 12 675 extracted from espacenet.com database on Oct. 9, 2014, 11 pages.
English language abstract not found for DE 10 2010 060 446; however, see English language equivalent U.S. 2012/0315024. Original document extracted from espacenet.com database on Oct. 9, 2014, 21 pages.
English language abstract and machine-assisted English translation for EP 0 743 206 extracted from espacenet.com database on Oct. 9, 2014, 12 pages.
English language abstract not found for FR 2 074 687; however, see English language translation of Claim 1 provided by Gevers France on Dec. 19, 2014. Original document extracted from espacenet.com database on Oct. 9, 2014, 18 pages.
Machine-Assisted English translation for FR 2 214 870 extracted from espacenet.com database on Oct. 9, 2014, 7 pages.

* cited by examiner

13

27

28

31  $e_r$  33  37

11

ELECTRICAL HEATING DEVICE FOR A MOTOR VEHICLE, AND ASSOCIATED HEATING, VENTILATION AND/OR AIR CONDITIONING APPARATUS

RELATED APPLICATIONS

This application is the National Stage of International Patent Application No. PCT/EP2013/052527, filed on Feb. 8, 2013, which claims priority to and all the advantages of French Patent Application No. 12/00930, filed on Mar. 28, 2012, the content of which is incorporated herein by reference.

The invention relates to an electrical heating device for a motor vehicle. The invention applies more particularly to ventilation, heating and/or air-conditioning apparatuses for motor vehicles.

Conventionally, the air for heating the passenger compartment of a motor vehicle, and for demisting and de-icing operations, is heated by the passage of an airflow through a heat exchanger, more specifically by heat exchange between the airflow and a fluid.

Generally, the fluid is a coolant in the case of a heat engine.

However, this mode of heating may prove either unsuitable or insufficient for ensuring rapid and efficient heating of the passenger compartment of the vehicle, in particular for heating the passenger compartment or for the performance of demisting or de-icing operations prior to the vehicle being used in a very cold environment or else when a very rapid rise in temperature is desired.

With an electric vehicle, the heating function is no longer performed by the circulation of coolant in the heat exchanger.

A water system may be provided to heat the passenger compartment.

This mode of heating may also prove either unsuitable or insufficient for ensuring rapid and efficient heating of the passenger compartment of the vehicle.

Moreover, in order to reduce the space requirements and cost of the additional water system, it is also known for electric vehicles to use an air-conditioning loop acting in heat-pump mode. Thus, the air-conditioning loop, which is traditionally used to cool an airflow using a refrigerant, is in this case used so as to heat the airflow. To this end, an evaporator of the air-conditioning loop should be used as a condenser.

However, this mode of heating may also prove either unsuitable or insufficient. Indeed, performance of the air-conditioning loop in heat-pump mode depends on external climate conditions; and if the ambient air temperature is too low, this air cannot be used as a source of thermal energy.

To overcome these disadvantages of the prior art, one known solution is to attach an additional electrical heating device to the heat exchanger, to the water system or else to the air-conditioning loop.

Such an electrical heating device can be adapted to heat the fluidupstream, said fluid perhaps being the coolant for the heat engine, or the water for the water system for heating the passenger compartment of the electric vehicle or else the refrigerant of the air-conditioning loop.

For example, such electrical heating devices are known as those comprising a plurality of heating means, such as positive temperature coefficient (PTC) elements, which are collected in a housing in such a way as to define a heating chamber around the plurality of PTC heating means and in which the fluid to be heated circulates.

However, such heating devices occupy a relatively large amount of space and may be fairly heavy.

In addition, these known electrical heating devices may lead to a relatively significant head loss, which does not comply with the reference values set by some car manufacturers.

Furthermore, some known heating devices may lead to a significant heating inertia, which limits thermal performance.

The object of the invention is therefore to overcome at least some of the disadvantages of the prior art by proposing an electrical heating device that limits head loss and heating inertia while occupying little space.

To achieve this, the invention relates to a device for electrically heating fluid for a motor vehicle, said heating device comprising at least one module for heating said fluid, said at least one heating module comprising a central core and a heating element defining a circuit for guiding fluid between said heating element and said central core, characterised in that said at least one heating module comprises at least one disruptive element which is arranged in the circuit for guiding fluid around the central core and capable of disrupting the flow of said fluid.

According to another aspect of the heating device, the disruptive element extends at least in part over the entire length of said guide circuit.

According to another aspect of the heating device, the disruptive element has a generally tubular shape.

According to another aspect of the heating device, the disruptive element is made of metal material.

According to another aspect of the heating device, the disruptive element is in contact with an internal surface of the heating element.

According to another aspect of the heating device, the disruptive element is in contact with an external surface of the central core.

According to another aspect of the heating device, the disruptive element extends at least in part over the entire thickness of the guide circuit.

According to another aspect of the heating device, the disruptive element comprises at least one rib.

According to another aspect of the heating device, the rib is substantially helicoidal.

According to another aspect of the heating device, the rib points towards the internal surface of the heating element.

According to another aspect of the heating device, the disruptive element comprises protruding bosses.

According to another aspect of the heating device, the protruding bosses point towards the internal surface of the heating element.

According to another aspect of the heating device, the disruptive element is a separate element from the central core and the heating element.

According to another aspect of the heating device, the disruptive element comprises a metal sheet.

According to another aspect of the heating device, the disruptive element is force-fitted in the heating element.

According to another aspect of the heating device, the disruptive element and the central core are formed in one piece.

The invention also comprises a ventilation, heating and/or air-conditioning apparatus for a motor vehicle, comprising at least one electrical heating device of the present invention.

By disrupting the flow of the fluid in the guide circuit, the disruptive element promotes heat exchange between the fluid and the heating element, thereby improving the efficiency of the heating device.

The disruptive element may be metal and, owing to its good properties of thermal conductivity, allows for better conduction of the heat originating from the heating element to a portion of the guide circuit that is remote from the heating element.

In addition, when the disruptive element is in contact with the internal surface of the heating element, conduction of heat into the fluid zones that are remote from said heating element is even better still. This also makes it possible to improve the efficiency of the heating device.

Other features and advantages of the invention will emerge more clearly upon reading the following description, which is given as an illustrative and non-limiting example, and from the accompanying drawings, among which:

FIG. 3c is a front view of the disruptive element in FIG. 3a;

FIG. 4b shows a flattened-out metal sheet of the disruptive element of the heating device in FIG. 4a;

In these figures, substantially identical elements have the same reference numerals.

Figure 1:
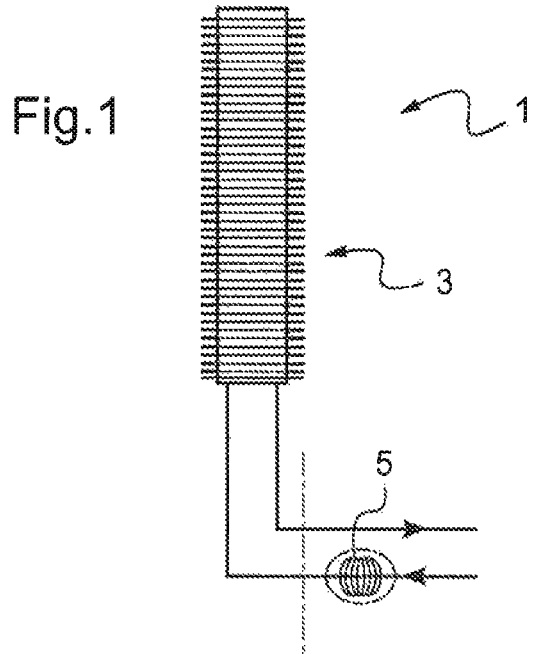
FIG. 1 shows schematically and in a simplified manner a ventilation, heating and/or air-conditioning apparatus for a motor vehicle, comprising a device for electrically heating fluid according to the present invention.

FIG. 1 schematically shows part of a ventilation, heating and/or air-conditioning apparatus 1 of a motor vehicle, comprising a water heating system 3 for heating the passenger compartment of an electric vehicle.

This ventilation, heating and/or air-conditioning apparatus 1 comprises, upstream of the water heating system 3, an electrical heating device 5 for heating the water before it enters the heating system 3.

Shown here is a water system for heating the passenger compartment of an electric vehicle.

Of course, it may also be provided for the electrical heating device 5 to be arranged upstream of the evaporator of an air-conditioning loop capable of operating in heat-pump mode so as to heat the refrigerant.

Such an electrical heating device 5 could also be provided upstream of a heat exchanger using the coolant of the heat engine as a heat-transfer fluid. Such an electrical heating device 5 could also be provided upstream of a heat exchanger for controlling the temperature of a device for storing electrical energy, sometimes described as a battery unit, for an electrically driven or hybrid vehicle.

Figure 2:
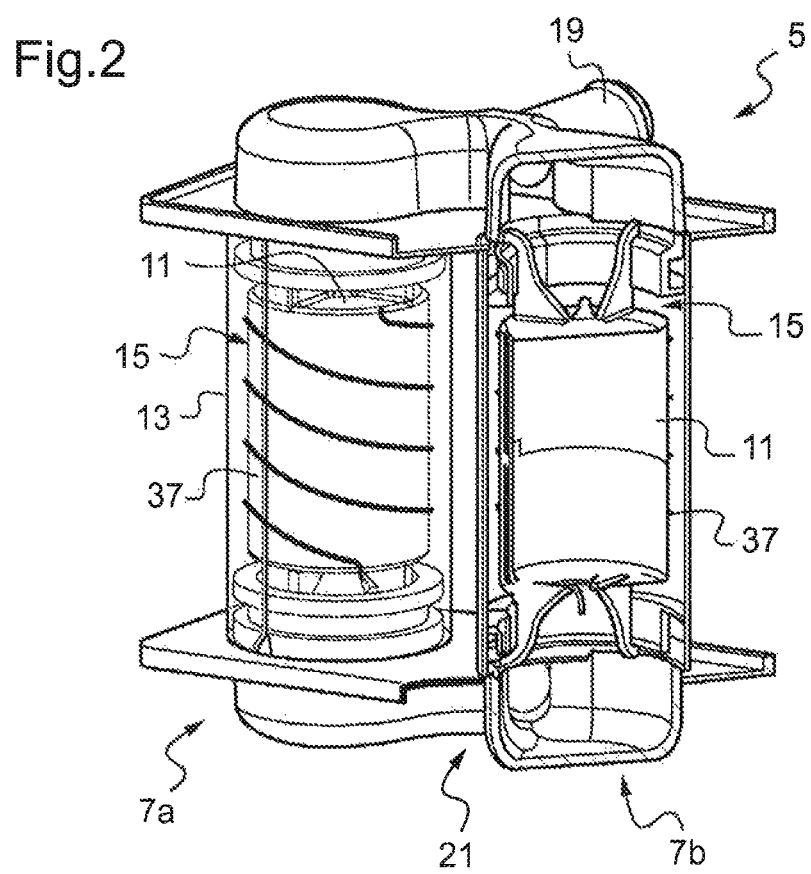
FIG. 2 shows a heating device in a cross section along a radial axis of a heating module.

FIG. 2 schematically shows a sample electrical heating device 5.

The heating device 5 comprises, for example, at least one first heating module 7a and a second heating module 7b, placed side by side substantially in parallel. The heating device 5, with the heating modules 7a, 7b arranged in this manner, have a lower heating inertia. This arrangement also makes it possible to reduce the amount of space occupied by the heating device 5 and allows for greater efficiency in heating the fluid by reducing the volume of said fluid in the heating modules 7a, 7b.

Furthermore, such a heating device 5 produces a head loss of lower than 100 mbar at 1000 l/h. These results make it possible to meet the head loss requirements set by some car manufacturers.

A heating module 7a, 7b comprises a central core 11 and a heating element 13 produced in the form of an enclosure that basically surrounds the central core 11. The heating element 13 may, for example, be operated by a control system (not shown).

The central core 11 and the heating element 13 are, for example, substantially cylindrical.

The central core 11 and the heating element 13 may be concentric.

The central core 11 and the heating element 13 define a circuit 15 for guiding the fluid to be heated between the central core 11 and the heating element 13. In other words, the external surface of the central core 11 and the internal surface of the heating element 13 define a volume of the fluid to be heated that is circulating around the central core 11.

The heating device 5 further comprises at least one fluid inlet pipe 19 and at least one fluid outlet pipe 21. The inlet pipe 19 and outlet pipe 21 both, for example, project from the heating device 5.

In the example shown, the inlet pipe 19 is common to the two heating modules 7a, 7b. In the same way, the outlet pipe 21 is common to the two heating modules 7a, 7b.

In order to increase the heat exchange between the fluid and the heating element 13, a disruptive element 37 of the heating module is arranged in the guide circuit 15 around the central core 11 so as to disrupt the flow of the fluid.

In the example, the fluid enters the heating device 5 through the inlet pipe 19. It then penetrates each of the heating modules 7a, 7b. It flows in a disrupted manner along the guide circuit 15. A heat transfer thus takes place between the internal surface of the heating element 13 and the fluid. Indeed, the heating element 13 gives the fluid some heat. Then, the heated fluid exits the heating device 5 through the outlet pipe 21.

By disrupting the flow of the fluid in the guide circuit 15, the disruptive element 37 promotes heat exchange between the fluid and the heating element 13, thereby improving the efficiency of the heating device 5.

According to a first embodiment shown by FIGS. 3a, 3b, 3c, 4a and 4b, the disruptive element 17, 27 arranged between the central core 11 and the heating element 13 is in contact with the internal surface of the heating element 13. The disruptive element 17, 27 may extend in the direction of the central core 11.

Said disruptive element 17, 27 made of metal material has a surface that is in contact with the fluid. Owing to the good properties of thermal conductivity of the metal material, the disruptive element 17, 27 conducts the heat from the heating element 13 towards the central core 11 as far as a portion of the guide circuit 15 that is remote from the heating element 13. Thus, the temperature of the fluid in the guide circuit is homogenous, such that the fraction of the fluid circulating close to the internal surface of the heating element 13 and the fraction of the fluid circulating at a distance from the heating element 13 have substantially the same temperature.

Said disruptive element 17, 27 comprises, for example, a sheet of aluminium, copper or brass. The metal sheet is preferably an aluminium sheet. Indeed, this material has good corrosion resistance and good compatibility with the glycol fluid used in the electrical heating device. In addition, this material costs less.

Figure 3A:
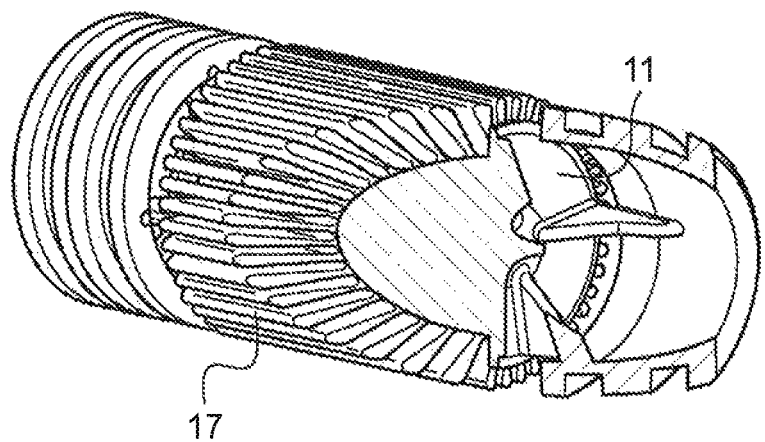
FIG. 3a is a perspective view and essentially a cross section of the disruptive element of a heating device according to a first embodiment.
Figure 3B:
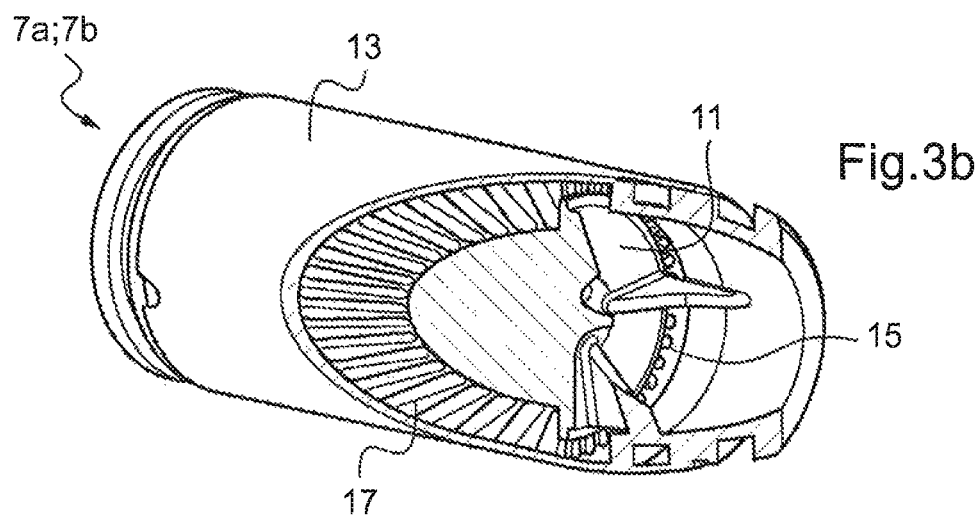
FIG. 3b is a perspective view and essentially a cross section of the heating device in FIG. 3a with a heating element.
Figure 3C:
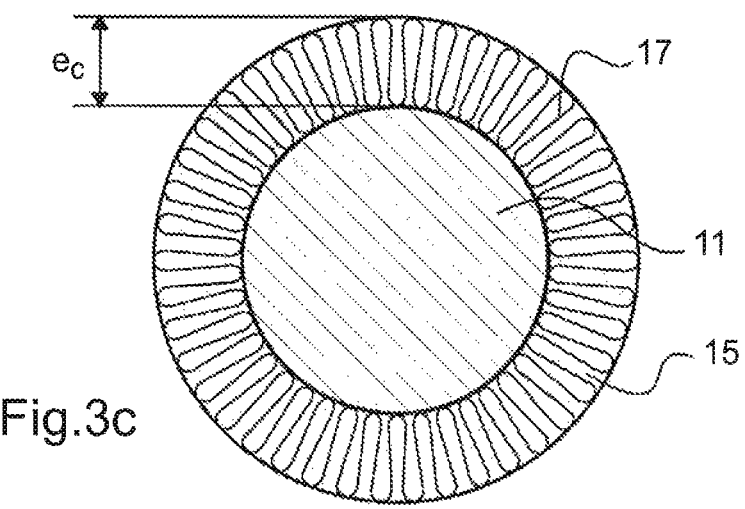

According to a first embodiment of the present invention shown in FIGS. 3a, 3b and 3c, the disruptive element 17 comprises a metal sheet. The metal sheet may be corrugated, that is to say bent backwards on itself in the manner of an accordion, in which case the metal disruptive element 17 is said to be "finned". The two longitudinal edges of the metal sheet may be joined so as to form a tube having a, for example, substantially circular cross section.

The internal edges of the fins of the metal disruptive element 17 are also in contact with the external surface of the central core 11. The "finned" metal disruptive element 17 extends at least in part over the entire thickness $e_c$ of the guide circuit 15. When said element extends over the entire thickness $e_c$ of the guide circuit 15, heat transfer is improved.

The efficiency of the heat exchange increases with the size of the heat exchange surface, that is to say with the size of the surface of the "finned" metal disruptive element 17 in the present case.

Figure 4A:
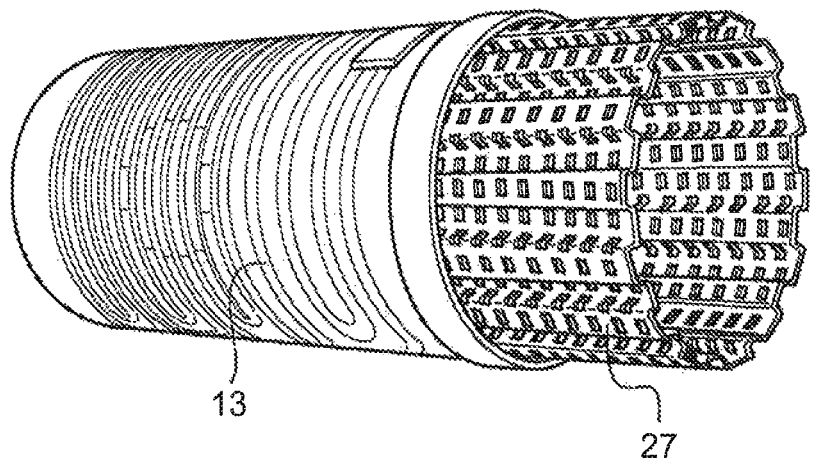
FIG. 4a is a perspective view of a disruptive element, part of which is shown outside the heating element, of a heating device according to a variant of the first embodiment.
Figure 4B:
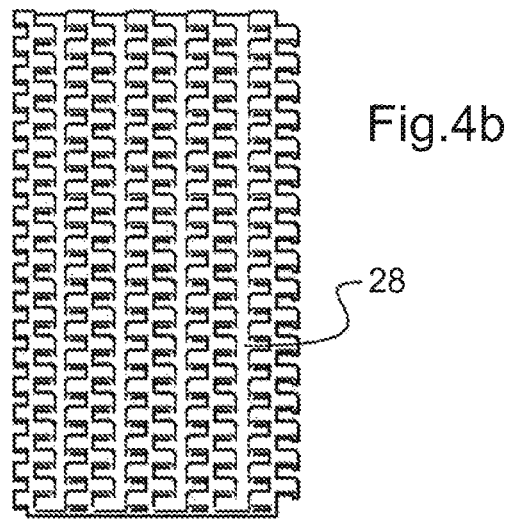

In a variant of the first embodiment shown in FIG. 4a, the disruptive element 27 comprises a metal sheet having a pattern in relief, for example uniform and uniformly distributed bosses. These bosses can be produced by deforming the metal sheet 28 as shown in FIG. 4b. The two longitudinal edges of the sheet join so as to form a tube having a, for example, substantially circular cross section.

The thickness of the metal disruptive element 27 may be smaller than the thickness of the guide circuit 15. This is known as a "thin" metal disruptive element 27.

Production of the thin metal disruptive element 27 is envisaged such that its external diameter is substantially larger than the internal diameter of the heating element 13. In this way, the thin metal disruptive element 27 is force-fitted in the heating element 13, thereby ensuring good contact and, as a result, a good transfer of heat between the heating element 13 and the thin metal disruptive element 27.

According to another embodiment, the external surface of the thin metal disruptive element 27 is connected to the internal surface of the heating element 13, for example by brazing or welding said surfaces to ensure good mechanical and thermal contact.

Compared with the "finned" metal disruptive element 17 in FIGS. 3a, 3b and 3c, the thin metal disruptive element 27 in FIGS. 4a and 4b has the advantage of leading to lower head losses.

A second embodiment will now be described with reference to FIGS. 5, 6a and 6b. In this second embodiment, the internal surface of the disruptive element 37, 47 is in contact with the external surface of the central core 11.

The disruptive element 37, 47 can, for example, be made of a metal material such as aluminium, or else of a plastics material such as polyamide.

The external surface of the tubular disruptive element 37, 47 has deformations so as to disrupt the flow of the fluid along the guide circuit 15.

Figure 5:
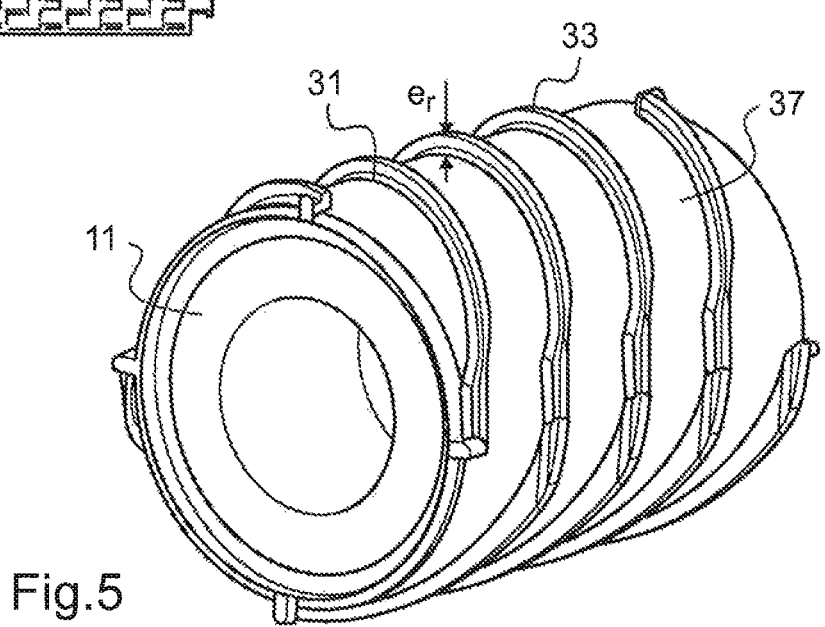
FIG. 5 is a perspective view of a disruptive element around a central core of a heating device according to a second embodiment.

According to a second embodiment shown in FIG. 5, the external surface of the disruptive element 37 has at least one rib 31 pointing towards the internal surface of the heating element 13. The rib 31 may have a substantially helicoidal shape. The flow of the fluid along the guide circuit thus follows a substantially helicoidal path. The rib 31 of the disruptive element 37 thus disrupts the flow of the fluid, thereby improving the heat exchange between the heating element 13 and the fluid.

The thickness $e_r$ of the rib 31 may extend as far as the internal surface of the heating element 13.

There is optimal heat exchange when the edge 33 of the rib 31 is in contact with the internal surface of the heating element 13. In this case it is possible to fix the disruptive element 37 to the internal surface of the heating element 13 in the region of the edge 33 of the rib 31, for example by brazing or welding. In this case the disruptive element 37 is made of metal material.

According to other embodiments, said rib 31 may have an intermediate thickness $e_r$; in this case the disruptive element 37 has a lower thickness than the thickness of the guide circuit 15.

Figure 6A:
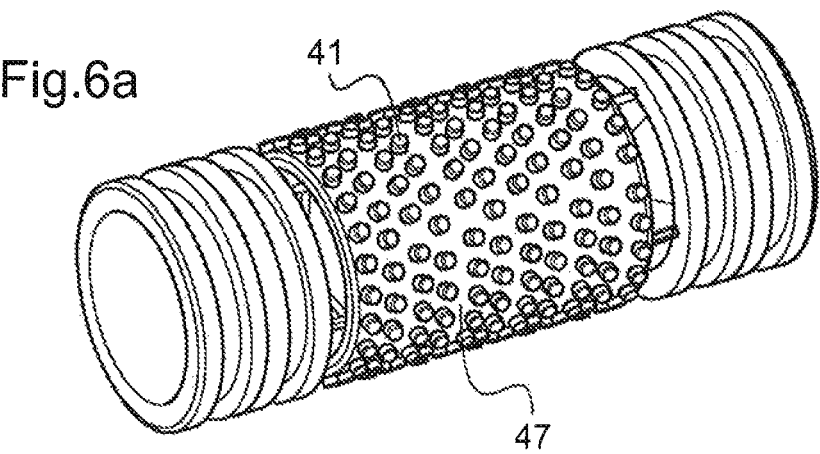
FIG. 6a is a perspective view of a disruptive element of a heating device according to a variant of the second embodiment.
Figure 6B:
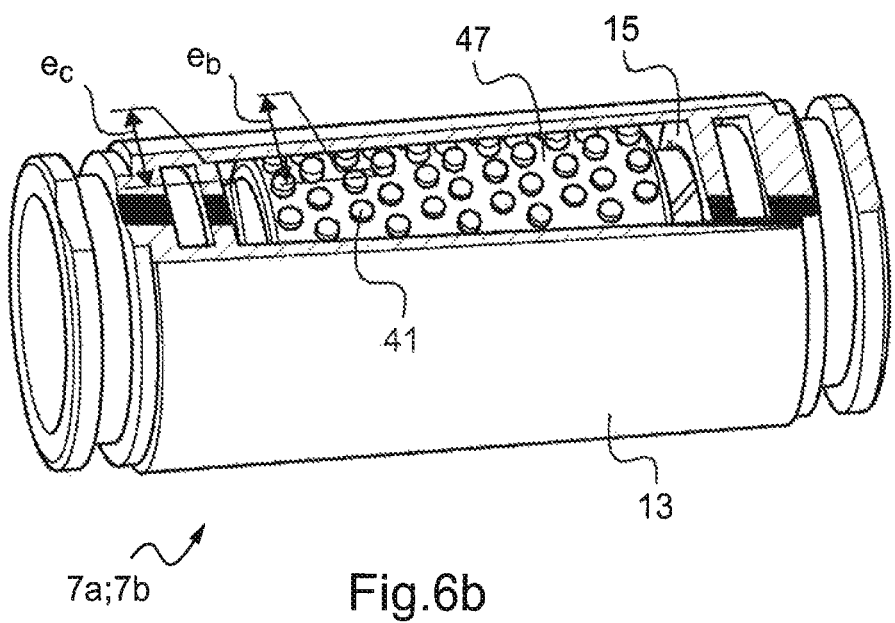
FIG. 6b is a perspective view and essentially a partial cross section of the heating device in FIG. 6a with a heating element.

According to a variant of the second embodiment shown in FIGS. 6a and 6b, the external surface of the disruptive element 47 has bosses 41 which protrude in the direction of the internal surface of the heating element 13. The bosses 41 of the disruptive element 47 disrupt the flow of the fluid, thereby improving the heat exchange between the heating element 13 and the fluid. These bosses 41 may be either uniformly or non-uniformly distributed over the surface of the central core or over the surface of the disruptive element or any other surface in contact with the fluid to be disrupted.

As shown in FIG. 6b, the thickness $e_b$ of the bosses 41 may extend as far as the internal surface of the heating element 13 so as to be in contact with said internal surface of the heating element 13.

According to other embodiments, the bosses 41 may also have an intermediate thickness $e_b$; in this case the disruptive element 47 has a lower thickness than the thickness $e_c$ of the guide circuit.

According to an embodiment (not shown), the internal surface of the heating element 13 has at least one disruptive element 17, 27.

A third embodiment (not shown) will now be described. This third embodiment differs from the second embodiment in that the disruptive element and the central core are formed in one piece.

In this configuration, the disruptive element has a deformation arranged on the external surface of the central core so as to disrupt the circulation of the fluid along the guide circuit.

According to this third embodiment, the disruptive element may comprise at least one rib, said rib pointing towards the internal surface of the heating element.

Said rib may have a substantially helicoidal shape. The rib of the disruptive element thus disrupts the flow of the fluid, thereby improving the heat exchange between the heating element and the fluid.

The thickness of the rib may extend as far as the internal surface of the heating element. Said rib may also have an intermediate thickness, that is to say less than the thickness of the guide circuit.

According to a variant of the third embodiment, the disruptive element may comprise bosses, said bosses pointing towards the internal surface of the heating element.

The bosses of the disruptive element disrupt the flow of the fluid, thereby improving the heat exchange between the heating element and the fluid.

The thickness of said bosses may extend as far as the internal surface of the heating element. Said bosses may also have an intermediate thickness, that is to say less than the thickness of the guide circuit.

It can thus be seen that a heating device 5 comprising at least one disruptive element 17, 27, 37, 47 allowing for a transfer of heat between the heating element 13 and the fluid is more efficient than the prior art solutions.

The invention claimed is:

1. A device (5) for electrically heating fluid for a motor vehicle, said heating device (5) comprising at least one module (7a, 7b) for heating the fluid, said at least one heating module (7a, 7b) comprising a central core (11) and a heating element (13) defining a circuit (15) for guiding fluid between said heating element (13) and said central core (11), wherein said at least one heating module (7a, 7b) comprises at least one disruptive element (17) which is arranged in said circuit (15) for guiding fluid around said central core (11) and capable of disrupting a flow of said fluid, wherein said disruptive element (17) comprises a metal sheet, said metal sheet being bent backwards on itself to form a finned sheet comprising a plurality of internal edges and a plurality of external edges, with each one of said plurality of internal edges separated from a next adjacent one of said plurality of internal edges by one of said plurality of external edges, wherein said finned sheet is arranged in said circuit (15) such that a portion of the fluid is guided between said central core (11) and said plurality of internal edges and such that another portion of the fluid is guided between said heating element (13) and said plurality of external edges.

2. A device (5) according to claim 1, wherein said disruptive element (17) extends at least in part over an entire length of said guide circuit (15).

3. A device (5) according to claim 1, wherein said disruptive element (17) has a generally tubular shape.

4. A device (5) according to claim 1, wherein said disruptive element (17) is in contact with an internal surface of said heating element (13).

5. A device (5) according to claim 1, wherein said disruptive element (17) is in contact with an external surface of said central core (11).

6. A device (5) according to claim 1, wherein said disruptive element (17) extends at least in part over an entire thickness ($e_c$) of said guide circuit (15).

7. A device (5) according to claim 1, wherein said disruptive element (17) is a separate element from said central core (11) and said heating element (13).

8. A device (5) according to claim 1, wherein said disruptive element and said central core (11) are formed in one piece.

9. A ventilation, heating and/or air-conditioning apparatus (1) for a motor vehicle, wherein said apparatus (1) comprises at least one electrical heating device (5) according to claim 1.

10. A device (5) according to claim 1, wherein said plurality of external edges are contact with an internal surface of said heating element (13).

11. A device (5) according to claim 10, wherein said plurality of internal edges are in contact with an external surface of said central core (11).

12. A device (5) according to claim 1, wherein said plurality of internal edges are in contact with an external surface of said central core (11).

13. A device (5) according to claim 1, wherein said finned sheet extends at least in part over an entire thickness ($e_c$) of said guide circuit (15).

14. A device according to claim 1, wherein the central core (11) is solid.

15. A device (5) for electrically heating fluid for a motor vehicle, said heating device (5) comprising at least one module (7a, 7b) for heating the fluid, said at least one heating module (7a, 7b) comprising a central core (11) and a heating element (13) defining a circuit (15) for guiding fluid between said heating element (13) and said central core (11), wherein said at least one heating module (7a, 7b) comprises a disruptive element (27) which is arranged in said circuit (15) for guiding fluid around said central core (11) and capable of disrupting a flow of said fluid, wherein said disruptive element (27) comprises a metal sheet having a pattern in relief and uniform and uniformly distributed bosses, and wherein the thickness of said disruptive element (27) is smaller than the thickness of the circuit (15).

16. A device (5) according to claim 15, wherein said disruptive element (27) is force-fitted in said heating element (13).

17. The device (5) according to claim 15, wherein the thickness of the disruptive element (27) is smaller than the thickness of the circuit (15).

18. A ventilation, heating and/or air-conditioning apparatus (1) for a motor vehicle, wherein said apparatus (1) comprises at least one electrical heating device (5) according to claim 15.

19. A device (5) according to claim 15, wherein said metal sheet extends at least in part over an entire length of said guide circuit (15).

20. A device according to claim 15, wherein the central core (11) is solid.

* * * * *